United States Patent
Wang et al.

(10) Patent No.: US 8,326,946 B2
(45) Date of Patent: Dec. 4, 2012

(54) COMPACT DISC PLAYING SYSTEM AND ITS PLAY BACK METHOD

(75) Inventors: Bei Wang, Shanghai (CN); Declan Patrick Kelly, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1319 days.

(21) Appl. No.: 10/578,377

(22) PCT Filed: Nov. 4, 2004

(86) PCT No.: PCT/IB2004/052301
§ 371 (c)(1),
(2), (4) Date: May 5, 2006

(87) PCT Pub. No.: WO2005/045842
PCT Pub. Date: May 19, 2005

(65) Prior Publication Data
US 2007/0136240 A1    Jun. 14, 2007

(30) Foreign Application Priority Data
Nov. 10, 2003    (CN) .......................... 2003 1 0116103

(51) Int. Cl.
*G06F 15/16* (2006.01)

(52) U.S. Cl. ......... 709/219; 709/202; 709/203; 709/218

(58) Field of Classification Search .......... 709/202–203, 709/217–219
See application file for complete search history.

(56) References Cited

U.S. PATENT DOCUMENTS

| | | | |
|---|---|---|---|
| 6,351,442 B1 | 2/2002 | Tagawa et al. | |
| 6,564,255 B1 | 5/2003 | Mobini et al. | |
| 6,580,870 B1 | 6/2003 | Kanazawa et al. | |
| 7,219,136 B1* | 5/2007 | Danner et al. | 709/219 |
| 7,343,405 B2* | 3/2008 | Hirayama et al. | 709/217 |
| 7,451,229 B2* | 11/2008 | Klemets et al. | 709/217 |
| 7,500,007 B2* | 3/2009 | Ikezoye et al. | 709/217 |
| 7,565,672 B2* | 7/2009 | Yun | 725/46 |

(Continued)

FOREIGN PATENT DOCUMENTS

CN    1308437 A    8/2001

(Continued)

OTHER PUBLICATIONS

Anonymous, DVDSubber Add Subtitles to Your DVD, DVD Subber Website, Online,URL: www.Darkwet.Net, February 12, 2003, p. 1-8.

(Continued)

*Primary Examiner* — Bharat N Barot

(57) ABSTRACT

An optical disc playing system, comprises a selecting apparatus for receiving a command from a user, which requires to play a part of content of a program in the optical disc; a sending apparatus for sending a request which requires to provide the related information of said part of content; a receiving apparatus for receiving the related information; and a reading-out apparatus for reading out the received related information and said part of content. An optical disc playing method using said system comprises the steps of: receiving a command from a user, which requires to play a part of content of a program in the optical disc; sending a request which requires to provide the related information of said part of content; receiving the related information; and playing the disc in coordination with said part of content using the received related information.

16 Claims, 7 Drawing Sheets

U.S. PATENT DOCUMENTS

| | | | |
|---|---|---|---|
| 7,668,928 B2 * | 2/2010 | Newnam et al. | 709/219 |
| 8,190,709 B2 * | 5/2012 | Kanada et al. | 709/219 |
| 2001/0003814 A1 | 6/2001 | Hirayama et al. | |
| 2002/0081105 A1 | 6/2002 | Ando et al. | |
| 2003/0078891 A1 * | 4/2003 | Capitant | 705/57 |
| 2003/0110295 A1 | 6/2003 | Suzuki et al. | |
| 2003/0152366 A1 | 8/2003 | Kanazawa et al. | |
| 2003/0158950 A1 * | 8/2003 | Sako | 709/203 |
| 2003/0170011 A1 * | 9/2003 | Otsuka et al. | 386/125 |
| 2004/0006607 A1 * | 1/2004 | Kanada et al. | 709/219 |
| 2004/0013416 A1 * | 1/2004 | Mok | 386/125 |
| 2006/0218245 A1 * | 9/2006 | Horn | 709/218 |
| 2007/0100966 A1 * | 5/2007 | Peng et al. | 709/219 |

FOREIGN PATENT DOCUMENTS

| | | |
|---|---|---|
| JP | 11161663 | 6/1999 |
| JP | 2002247526 A | 8/2002 |
| JP | 2003249057 | 9/2003 |
| JP | 2003304498 A | 10/2003 |
| JP | 2003319344 | 11/2003 |
| WO | 9937057 A2 | 7/1999 |
| WO | 0063915 A1 | 4/2000 |
| WO | 03019560 A2 | 3/2003 |

OTHER PUBLICATIONS

Anonymous: DIVX Subtitles, Online, URL: www.DIVXSubtitles. Net, August 6, 2003, p. 1.

* cited by examiner

FG. 4

COMPACT DISC PLAYING SYSTEM AND ITS PLAY BACK METHOD

BACKGROUND OF THE INVENTION

The present invention relates to a playing system and its playing method, in particular to an optical disc playing system and its playing method.

Good viewing effect is achieved through the mutual coordination of audio and video during playing an optical disc. For users from various nations in the world, video is same and can be understood by anyone, whereas audio is expressed in language, so the users understand the audio of an optical disc based on the language mastered by them.

Optical discs in prior art store, at most, the audio expressed in a limited number of typical languages, such as English, Chinese, Russian, Spanish, German and Japanese. Only storing the audio expressed in the above several languages is not enough, however, there are many users all over the world who cannot understand these languages, thus the users who cannot master the above languages are impossible to understand the audio expressed in the above languages.

Of course, apparently it is not practical to store the audio expressed in almost all the languages in the optical disc storage to make more users understand the audio in an optical disc, since such a solution will certainly occupy a large space in the optical disc.

To overcome the above disadvantage and satisfy the need of more users, an optical disc playing method of downloading the audio from a network server occurs. The method is to send a downloading request to a network server via the player during playing an optical disc, the network server downloads to the player the audio of the complete optical disc expressed in a language required by the user.

In the above optical disc playing method, however, the player can only send the optical disc identification information (such as name or ID of the optical disc) and the category of the required language to a network server while sending a downloading request, it cannot send the essential content of the optical disc, even the most basic playlist, to the network server. Similarly, the network server can only identify the optical disc identification and the category of the required language in the content of the downloading request sent by a player, it cannot identify the essential content, even the most basic playlist, of an optical disc, and thus the network server can only send back the audio corresponding to all the playlists in an optical disc but cannot selectively download the audio corresponding to a part of content of an optical disc, such as the audio corresponding to one or more playlists.

It can be seen that the audio expressed in the required language of a whole optical disc has to be downloaded if a user wants to download the audio expressed in the required language corresponding to a part of playlists or playitems in an optical disc, which apparently extends the downloading time and increases the downloading burden. Thus, the network resource is wasted and viewing interest of the user is discounted at the same time.

Thus, there is a need for an improved optical disc playing system and its playing method.

BRIEF SUMMARY OF THE INVENTION

The present invention is to provide an optical disc playing method and system which downloads the audio, caption or director annotation corresponding to a part of content of a program in an optical disc.

The present invention provides a downloading method for downloading from a network server the audio, caption or director annotation corresponding to a part of content of a program in an optical disc during playing.

The optical disc playing method described by the present invention comprises the steps of: receiving a command from a user, which requires to play a part of content of a program in an optical disc; sending a request, which requires to provide the related information of said part of content; receiving the related information; and playing the disc in coordination with said part of content utilizing the received related information.

The optical disc playing system described by the invention comprises a selecting apparatus for receiving a command from a user, which requires to play a part of content of a program in the optical disc; a sending apparatus for sending a request which requires to provide the related information of said part of content; a receiving apparatus for receiving the related information; and a reading-out apparatus for reading out the received related information and said part of content.

The method for transferring the downloaded information during playing described by present invention comprises the steps of: receiving a downloading request, which requires to download the information corresponding to a part of content of a program in an optical disc; identifying content of the downloading request; and outputting the information corresponding to the downloading request to coordinate playing.

Since the audio, caption, and director annotation corresponding to a part of content of a program in an optical disc can be downloaded randomly during playing of the optical disc playing system of present invention, i.e. the information such as the audio, caption, and director annotation corresponding to one or more playlists and playitems can be downloaded randomly without downloading the information, such as the audio, caption, director annotation corresponding to the content of a whole optical disc each time, thereby reducing the downloading burden and saving the downloading time and making the whole downloading process random and dynamic.

Other objects and achievements of present invention and thorough understanding of present invention will be come clear and apparent through the following illustration and claims with reference to the accompanying drawings.

BRIEF DESCRIPTION OF THE DRAWINGS

The present invention will be illustrated in more details by way of examples and with reference to accompanying drawings.

The same signs represent similar or corresponding features and functions in all the above drawings.

DETAILED DESCRIPTION OF THE INVENTION

Figure 1:
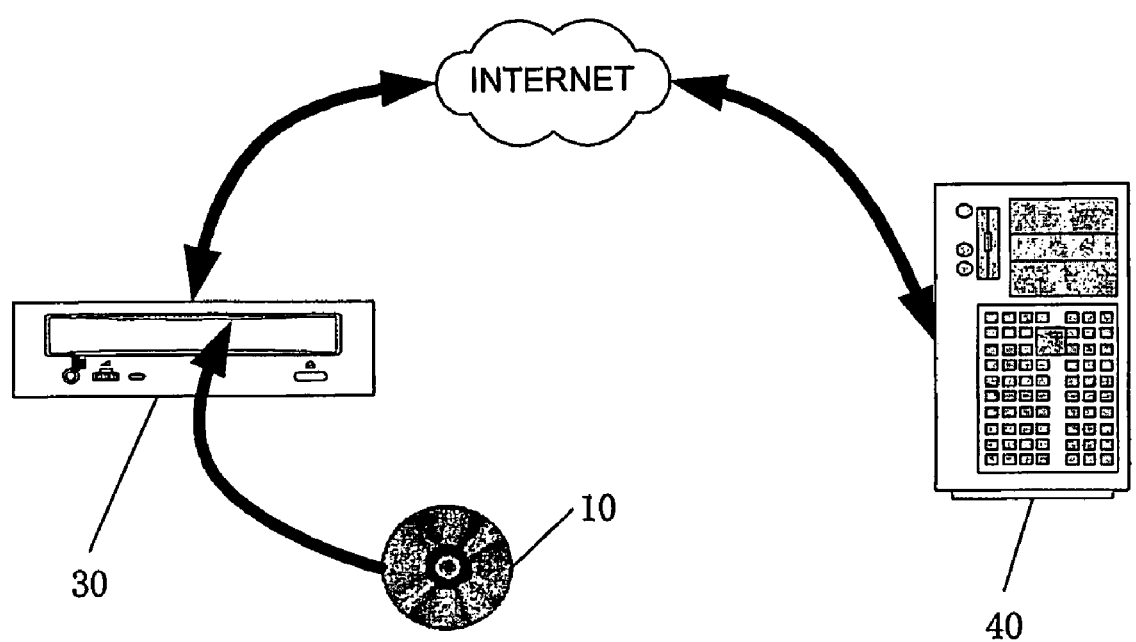
FIG. 1 is a schematic diagram of an optical disc playing system according to an embodiment of the invention.

As shown in FIG. 1, it is an embodiment of the optical disc playing system described by the present invention. The system comprises an optical disc 10, a player 30, and a network server 40. The player 30 is used to play the optical disc 10, and can be used to download the information such as audio, caption, director annotation corresponding to a part of content of a program in the optical disc 10 from the network server 40 during playing the optical disc 10, for example. downloading the information such as audio, caption, director annotation corresponding to one or more playlists.

The system will be illustrated by example of Blu-ray Disc. Blu-ray Disc is a new optical disc standard arising in recent years, the storage capacity of a currently produced Blu-ray Disc is up to 47 GB (for the detailed description of Blu-ray Disc, please refer to www.blu-ray.com).

Figure 2:
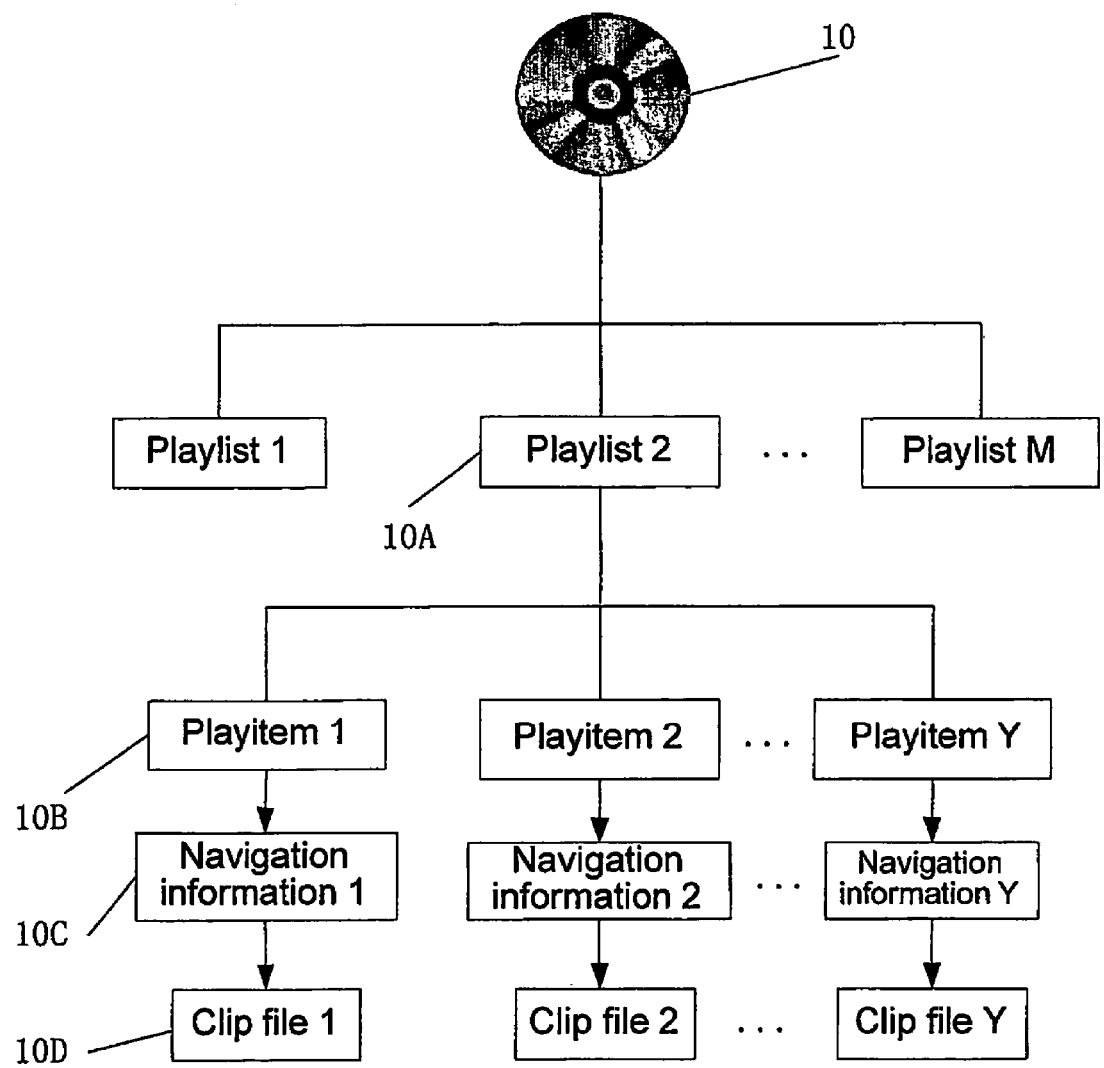
FIG. 2 is a structural schematic diagram of the optical disc illustrated in FIG. 1.

As shown in FIG. 2, it is the structural schematic diagram of a Blu-ray Disc 10. The Blu-ray Disc 10 comprises one or more playlists 10A. Each playlist 10A comprises one or more playitems 10B, and each playitem 10B corresponds to a navigation information 10C. FIG. 2 only illustrates that one navigation information 10C corresponds to one playitem 10B, which is just used as an example. Actually, one navigation information 10C can be pointed by one or more playitems 10B. Each navigation information 10C comprises clock information and address information, and all the navigation information 10C have one to one correspondence with all the Clip Files 10D in an optical disc. Each clip file 10D has video, audio expressed in a limited number of languages, caption, director annotation stored therein. The information such as the audio, caption, director annotation expressed in other languages which is not stored in Blu-ray disc 10 has been stored in the network server 40 to meet the need of more users of downloading at any moment. In addition, a user can select any one or more playlists 10A during playing the Blu-ray disc 10. Below it will be illustrated only by example of audio.

Figure 3:
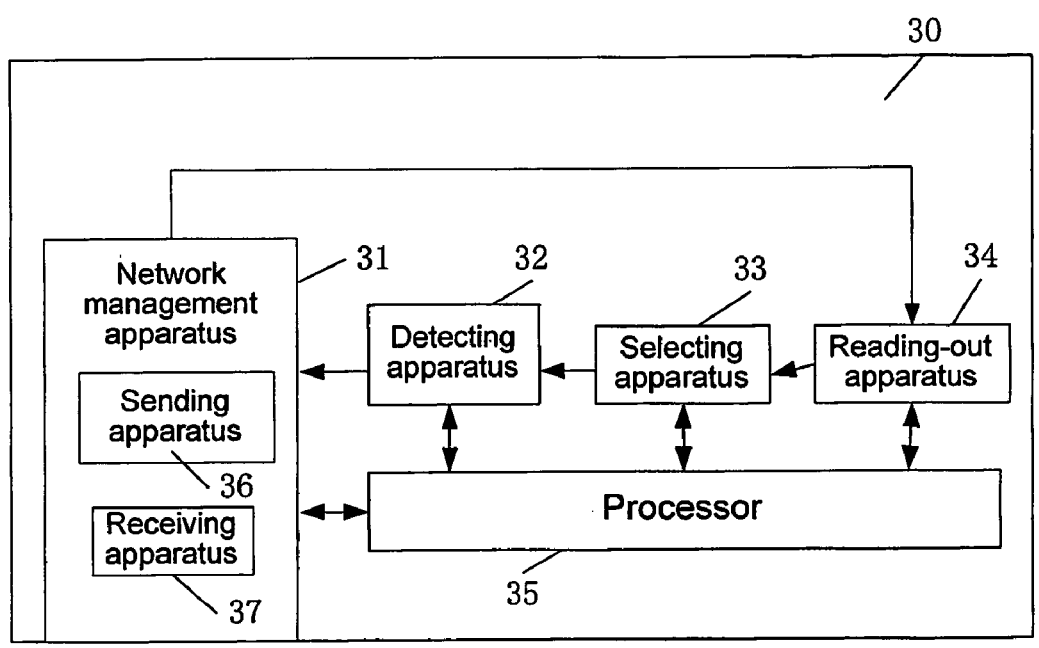
FIG. 3 is a structural schematic diagram of the player illustrated in FIG. 1.

As shown in FIG. 3, the player 30 comprises a network management apparatus 31, a detecting apparatus 32, a selecting apparatus 33, a reading-out apparatus 34, and a processor 35. The processor 35 is used to control the working process of other components in the player 30.

The reading-out apparatus 34 is used to read out the optical disc information and the information downloaded from the network server (details will be described later). The selecting apparatus 33 is used to select the category of language and the playlists expressed in the selected language category (hereinafter simply referred to as selected content). The detecting apparatus 32 is used to detect whether there is audio corresponding to the selected content in the optical disc and storage of the player.

The network management apparatus 31 comprises a sending apparatus 36 and a receiving apparatus 37. Under the premise that the above detecting apparatus 32 detects that there is no audio related to selected content in the player 30 and the optical disc 10, the sending apparatus 36 is used to send a downloading request to the network server, the content of the downloading request comprises an optical disc identification (name or ID of the optical disc), selected language category and playlist, etc. And the receiving apparatus 37 is used to receive the audio related to content of the downloading request.

Figure 4:
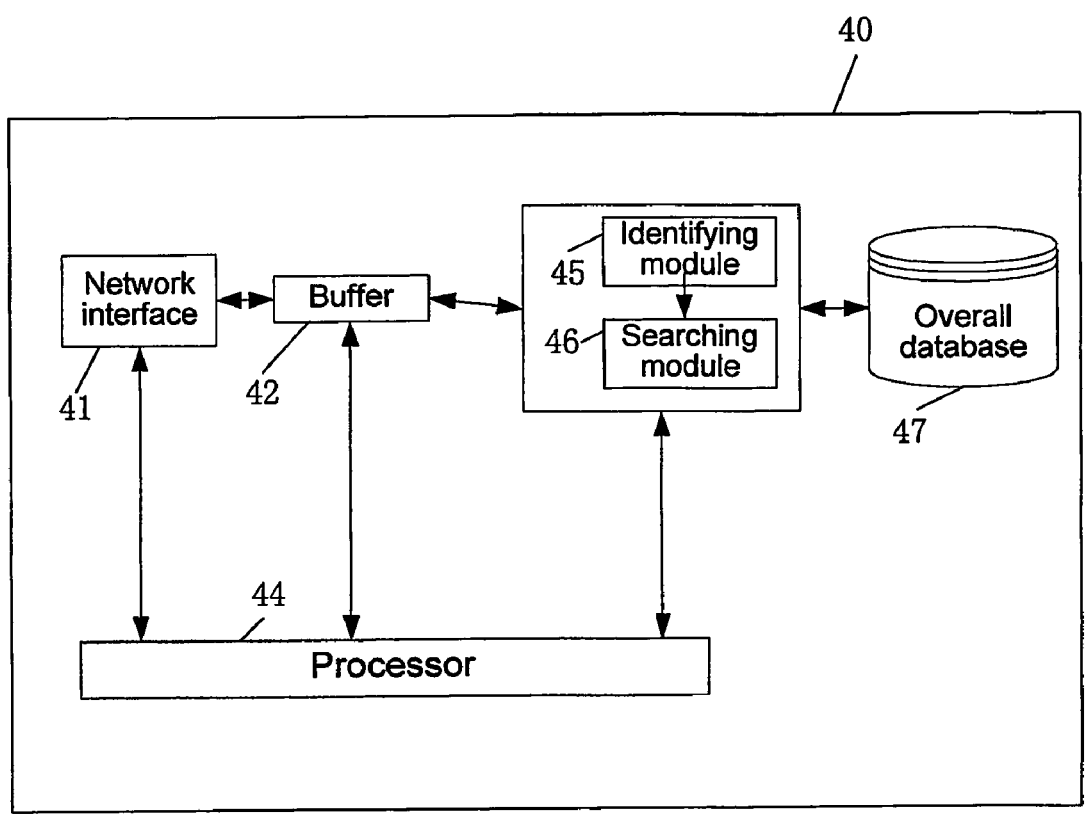
FIG. 4 is a structural schematic diagram of the network server illustrated in FIG. 1.

As shown in FIG. 4, the network server 40 comprises a network interface 41, a buffer 42, an identifying module 45, a searching module 46; a processor 44 and a overall database 47. The processor 44 is used to control the working process of other components. The network interface 41 is connected to INTERNET and the buffer 42 respectively to receive the downloading request and request content transferred from INTERNET and input the downloading request and request content into buffer 42. The buffer 42 is used to buffer the downloading request and request content transferred from the network interface 41 and is connected to the identifying module 45.

The above identifying module 45 is used to identify request content of the downloading request transferred from the player 30, and transfer the content of the identified downloading request to the searching module 46. The content of the downloading request comprises an optical disc identification, a selected playlist, a selected language category used to express audio of the selected playlist, etc. The searching module 46 is used to find corresponding audio in the overall database 47 according to the content of the identified downloading request, and output the found corresponding audio to the optical disc player 30 through the buffer 42, the network interface 41 and INTERNET.

Figure 5:
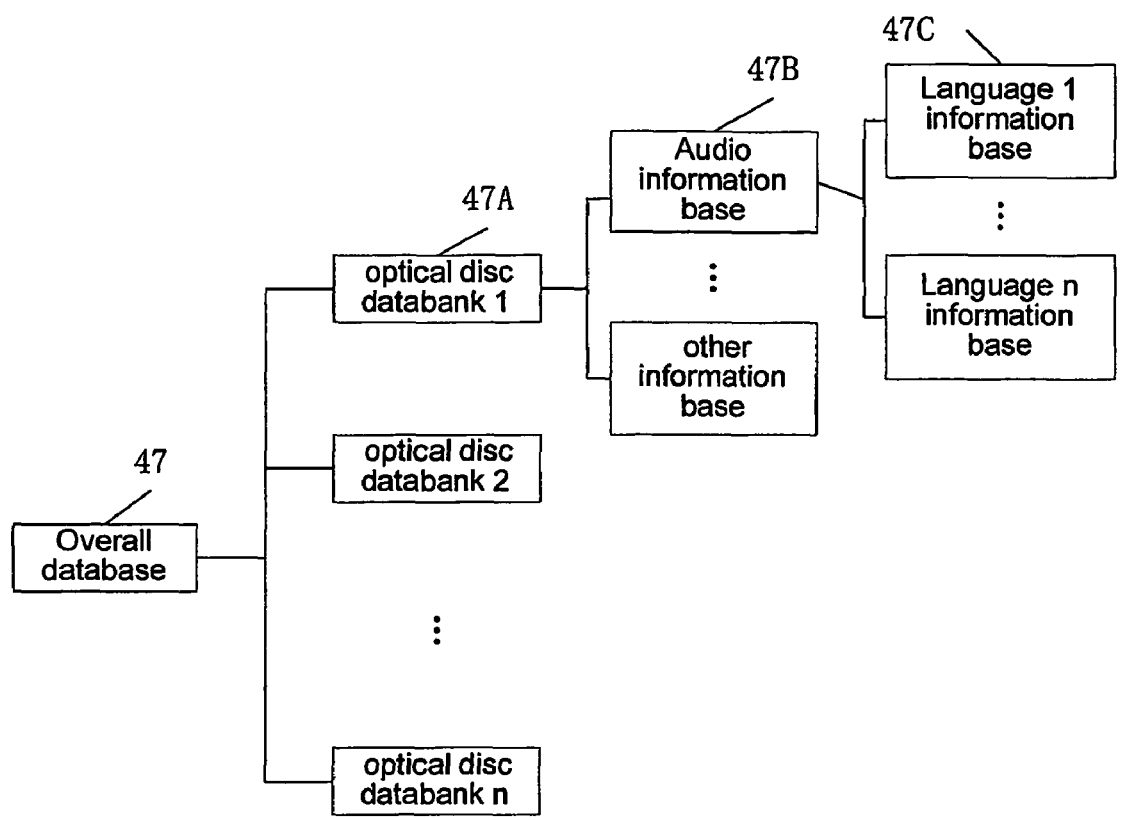
FIG. 5 is a structural schematic diagram of a overall database of the network server illustrated in FIG. 1.

As shown in FIG. 5, the overall database 47 comprises various optical disc databanks 47A. Each optical disc databank 47A comprises an audio information base 47B, and each audio information base 47B comprises many language information bases 47C, such language information bases 47C stores the audio information expressed in different languages respectively.

The whole audio information in each language information base 47C is included in a plurality of clip files. Each clip file corresponds to a piece of navigation information containing address and clock information. Each navigation information corresponds to one or more playitems. And each playitem is included in corresponding playlist (See FIG. 2)

Clip files, navigation information, playitems, and playlists stored on the network server 40 have one-to-one correspondence with those stored in the above optical disc 10, in particular the address and clock information in the navigation information is entirely same as that in navigation information 10C of the optical disc 10, in order to synchronize the downloaded audio with video in the optical disc 10 during playing. In the network server 40, clip files of the audio information base 47B contain audio information to play the optical disc 10 in coordination with the video information contained in clip files 10D of the optical disc 10.

Figure 6:
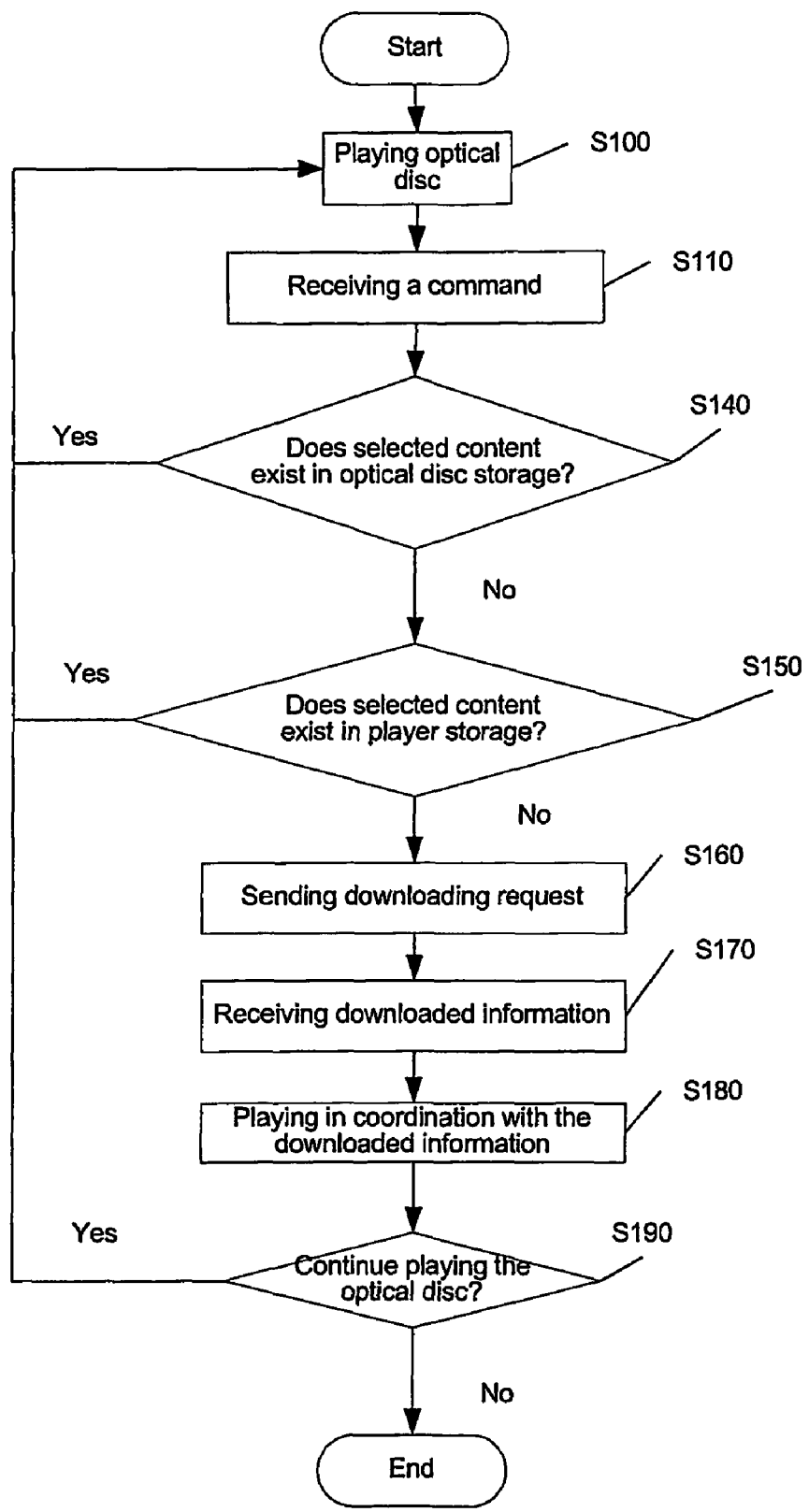
FIG. 6 is a flow chart of playing process of the player illustrated in FIG. 1.

As shown in FIG. 6, firstly the optical disc 10 is inserted into the player 30 for playing (step S100) during playing an optical disc in the optical disc playing system. During playing (at any moment during playing), the player 30 receives a command from the user (step S110), wherein the command comprises required content, for example, the category of required language, audio or other text information of a part of content of a program in the optical disc expressed by the selected language category. Selecting one or more playlists according to the user's command obtain a part of program content of the optical disc.

Then the required content is searched in the storage of the optical disc 10, i.e. audio corresponding to the selected language and selected playlist 10A is searched (step S140). If the required content found, the process moves to playing state (step S100); otherwise, the process continues to search in the storage of the player 30 (step S150). If the audio corresponding to content selected by the user is found in the storage of the player 30, the process moves to playing state (step S100); otherwise, a downloading request is sent to the network server 40 (step S160). And the content of the downloading request comprises the optical disc identification (optical disc name and ID, etc), the selected language category and playlists.

Next the player 30 receives the audio corresponding to the downloading content (step S170) (details will be described later), and plays in coordination with the information originally existing in the optical disc using the received audio (step S180).

Finally, it is determined that whether it needs to continue playing the optical disc (step S190), if so, the process returns to play the optical disc (step S100); otherwise, the playing ends.

Figure 7:
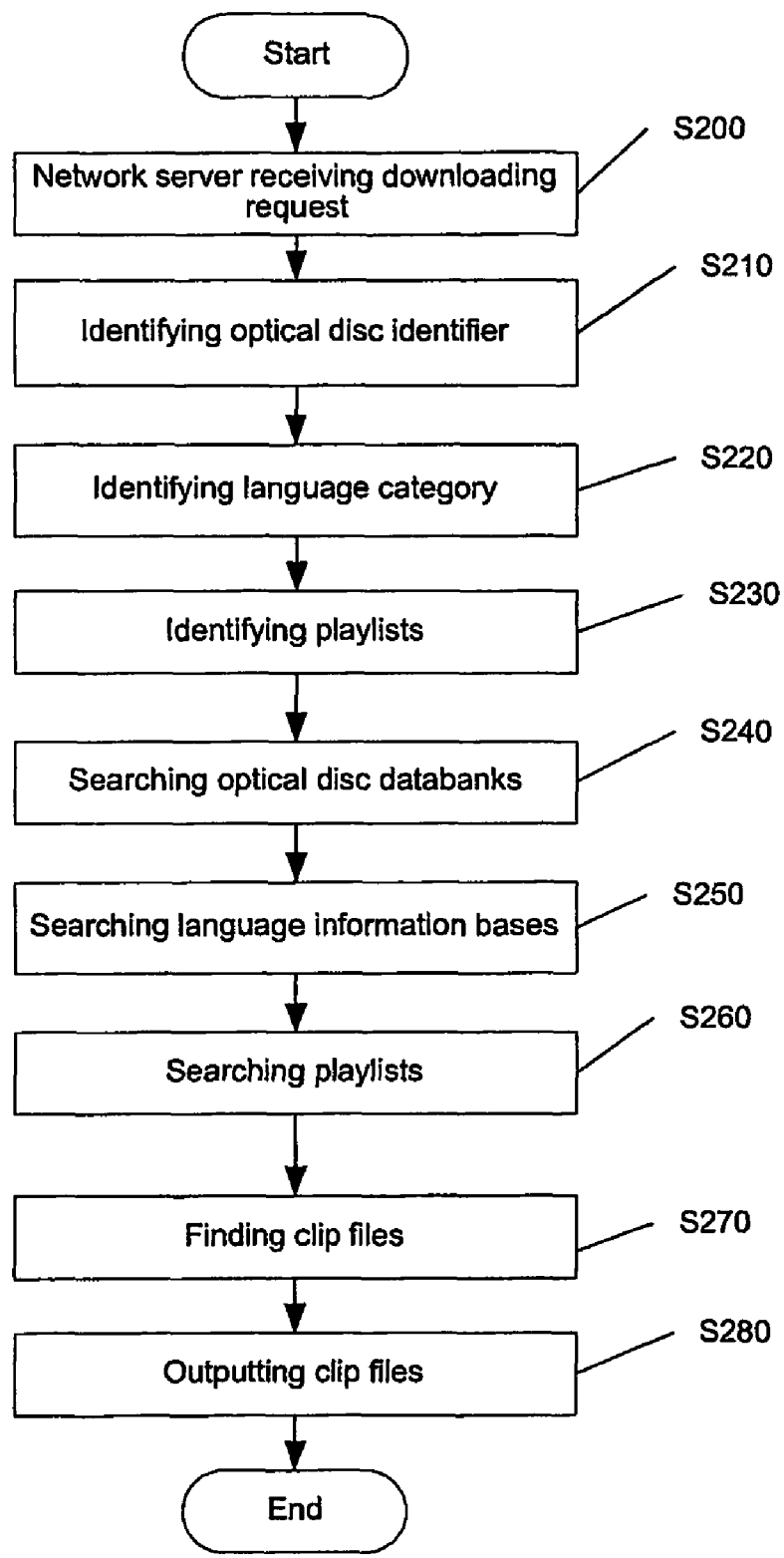
FIG. 7 is a flow chart of downloading information from the network server illustrated in FIG. 1.

As shown in FIG. 7, it is a flow chart of downloading required information from the network server 40 by the optical disc playing system.

Firstly, the network server 40 buffer receives the optical disc identifier (optical disc name or ID, etc), selected language category, playlist number and playitem information contained in the playlist sent from the player 30 (step S200).

Next, the network server 40 identifies optical disc identifier, the requested category, the requested language category and playlist sent from the player 30 (step S210, S220 and S230).

Then, the network server 40 finds the optical disc databank 47A corresponding to identified optical disc identifier in the overall database 47 (step S240), and finds the language information base 47C corresponding to the category of the required language in an audio information base 47B of the optical disc databank 47A (step S250).

Next the playlists which have one-to-one correspondence with identified playlists are found in the language category information base.

Finally, the clip files to be downloaded are found through the navigation information pointed by the playitems corresponding to the found playlists (step S270), the clip files to be downloaded comprise the audio to be downloaded and the clip files containing the audio are sent back to the player 30 (step S280).

The present invention can be not only for Blu-ray disc but also for other optical discs such as eDVD (enhanced digital video disc), etc.

The present invention can download both audio and other text information including caption and director annotation described above.

Furthermore, the present invention can download both audio or other text information corresponding to one or more playlists as well as audio or other text information corresponding to one or more playitems in one single playlist. Since the audio, caption, and director annotation corresponding to a part of content of a program in an optical disc can be downloaded randomly during playing of the optical disc playing system of present invention, i.e. the information such as the audio, caption, and director annotation corresponding to one or more playlists and playitems can be downloaded randomly without downloading the information, such as the audio, caption, director annotation corresponding to the content of a whole optical disc each time, thereby reducing the downloading burden and saving the downloading time and making the whole downloading process random and dynamic.

Although the present invention has been described with a particular embodiment, various alternatives, modifications and changes will be apparent to those skilled in the art. Therefore, the present invention will include all the alternatives, modifications and changes falling within the concept and scope of appended claims.

What is claimed is:

1. An optical disc playing method, operable in a processor within a player, the method comprising:
    receiving a command from an user, which requires playing a part of content of a program contained on an optical disc;
    determining whether related information associated with said part of content is available on said optical disc;
    sending a request to a network, the request requiring the related information of said part of content determined not on said optical disc be provided, said request including at least identification information of said optical disc;
    receiving the related information, said related information including navigation information;
    playing said part of content with the received related information, wherein the received navigation information is used in coordination with navigation information on said optical disc to play the part of the content with the received related information.

2. The optical disc playing method according to claim 1, wherein the part of content of a program contained on the optical disc includes a part of content corresponding to a playlist.

3. The optical disc playing method according to claim 1, wherein the request includes a language selected by the user.

4. The optical disc playing method according to claim 1, wherein the information corresponding to the part of content includes audio information.

5. The optical disc playing method according to claim 1, wherein the information corresponding to the part of content includes caption information.

6. An optical disc playing system, comprising:
    a selecting apparatus for:
        receiving a command from a user, which requires playing a part of content of a program contained on an optical disc; and
        determining whether related information associated with said part of content is available on said optical disc
    a sending apparatus for sending a request which requires providing related information of said part of content determined not on said optical disc to a network server, said request including at least identification information of said optical disc;
    a receiving apparatus for receiving the related information, said related information including navigation information;
    a reading-out apparatus for reading out the received related information wherein the received navigation information is used in coordination with navigation information on said optical disc to play the part of the content with the received related information.

7. The optical disc playing system according to claim 6, wherein the part of content of a program in the optical disc corresponds to a playlist.

8. The optical disc playing system according to claim 6, wherein the request includes a language selected by the user.

9. The optical disc playing system according to claim 6, wherein the information corresponding to the part of content includes audio information.

10. The optical disc playing system according to claim 6, wherein the information corresponding to the part of content includes caption information.

11. A method, operable in a processor within a server, for transferring downloaded information-during playing, the method comprising:
    receiving a downloading request which requires downloading information corresponding to a part of content of a program determined not contained on an optical disc, said request including at least identification information of said optical disc;
    identifying the part of the content in the downloading request; and outputting the information corresponding to the part of content of the downloading request with the part of content, wherein navigation information of the information is used in coordination with navigation information on said optical disc to play the part of the content with the received related information.

12. The method according to claim 11, wherein the part of content corresponds to a playlist.

13. The method according to claim 11, wherein the request also includes a language selected by the user.

14. The method according to claim 11, further comprising searching the information corresponding to the part of content of the downloading request.

15. The method according to claim 11, wherein the information corresponding to the part of content of the request includes audio information.

16. The method according to claim 11, wherein the information corresponding to the part of content of the request includes caption information.

* * * * *